Dec. 21, 1965     T. O. EDDINS     3,224,336
MISSILE LAUNCH RELEASE SYSTEM

Filed May 25, 1964     2 Sheets-Sheet 1

INVENTOR.
TIMOTHY O. EDDINS
BY
ATTORNEYS

Dec. 21, 1965 T. O. EDDINS 3,224,336
MISSILE LAUNCH RELEASE SYSTEM
Filed May 25, 1964 2 Sheets-Sheet 2
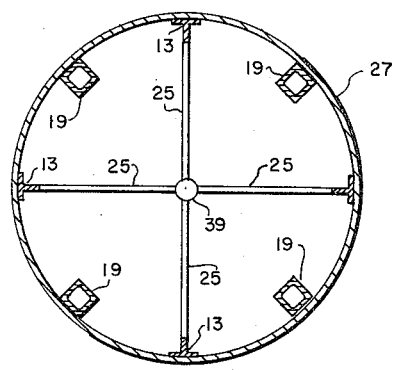
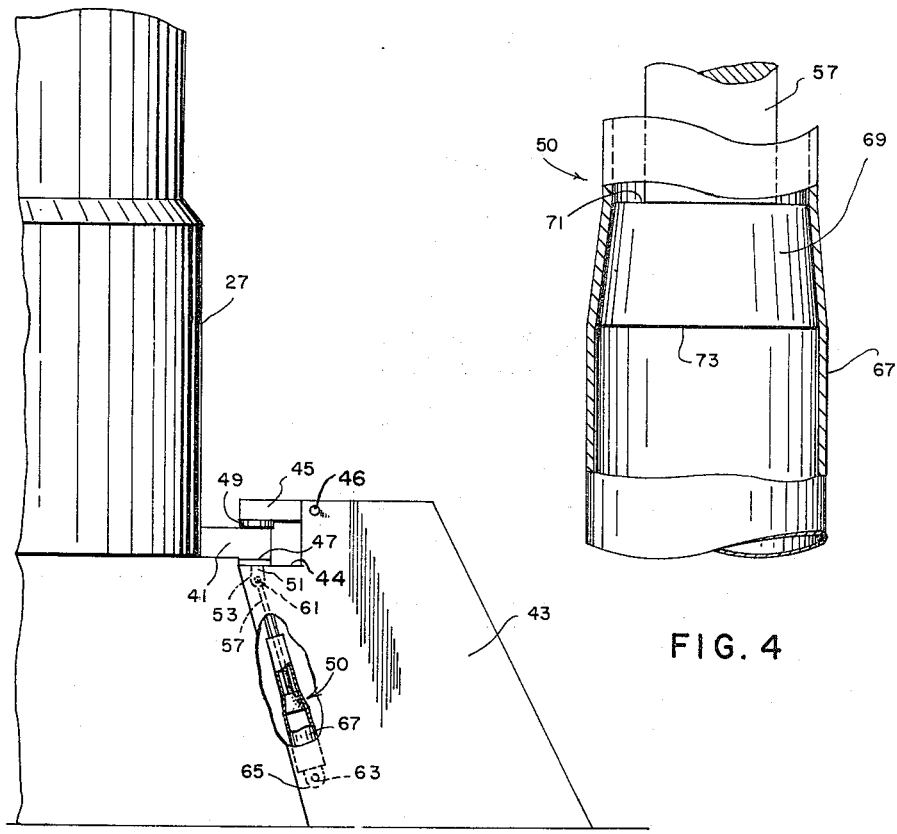
INVENTOR.
TIMOTHY O. EDDINS
BY
ATTORNEYS

United States Patent Office 3,224,336
Patented Dec. 21, 1965

3,224,336
MISSILE LAUNCH RELEASE SYSTEM
Timothy O. Eddins, Decatur, Ala., assignor to the United States of America as represented by the Administrator of the National Aeronautics and Space Administration
Filed May 25, 1964, Ser. No. 370,134
9 Claims. (Cl. 89—1.7)
(Granted under Title 35, U.S. Code (1952), sec. 266)

The invention described herein may be manufactured and used by or for the Government of the United States of America for governmental purposes without the payment of any royalties thereon or therefor.

This invention relates generally to launch pad missile release systems, and more particularly to apparatus for reducing the bending moment change rate in a missile thrust distribution structure when the missile hold down clamps are released at lift-off.

In missile boosters the design thrust of the rocket engines at launch is related to the vehicle's launch gross weight. Obviously the thrust must be greater than this gross weight; however, it should not be several orders of magnitude greater than lift-off gross weight of the vehicle. The reasons for this include the fact that, assuming that there are no provisions for throttling the engines (which is the case for the Saturn class of launch vehicles), the bending moment, as well as the accelerations imparted to the spacecraft near the end of the booster fuel supply, may well exceed acceleration force limitations on personnel, structure or some of the components carried by the vehicle. This is especially true in large vehicles since the ratio of the propellant weight to the vehicle structural weight is high—as high as possible for the given payload and mission.

Since by design all the engines of a non-throttleable rocket powered vehicle must be operating at maximum efficiency before lift-off can safely occur, it is necessary that the vehicle be mechanically held down on the launch pad to allow the rocket engine thrust to build up to its option lift-off value. As is well known, the stresses and bending moments produced during both the building up of the engine thrust level and the releasing of the launch vehicle has been a source of serious concern among individuals working in these fields. Although these stresses and bending moments are present in most launch vehicles, in smaller vehicles these forces are not so great as to cause undue concern. However, in the Saturn class of vehicles these forces are extremely large and, unless controlled, will tend to destroy the vehicle, especially in the area of the monocoque skin-propellant tank wall structure which serves also as a load bearing member in these missiles. By way of example, it can be seen that the sum of the concentrated forces exerted on the missile thrust structure at the missile hold down clamps will be the difference between the total thrust developed by the rocket engines and the instantaneous gross weight of the vehicle. For the Saturn this force is on the order of 250,000 or 300,000 pounds at each hold down clamp with 1.5 million pounds of thrust applied at each of the five engine connection points.

As mentioned hereinabove, while no design problems were present in the prior smaller vehicles, the increased individual engine thrust, total thrust and gross weight of the vehicle of the Saturn booster have given rise to several serious problems. It was found that the sudden release of the hold down clamps would cause a rebound of the thrust distributing structure so severe that rupture of the liquid hydrogen propellant tank skin which serves also as the vehicle exterior load carrying structure was probable. Such a rupture would obviously cause the abortion of the mission and the loss of the vehicle in addition to possible damage to launch pad structure and equipment.

It is accordingly an object of the present invention to provide a means for controlling the rate of change of the stresses and bending moments in the thrust distribution structure of a missile when the missile hold down clamps are released at lift-off.

It is another object of the invention to provide apparatus for controlling the rate of change of stresses and bending moments in the thrust distribution structure of a missile at launch which is simple in both design and operation, and which will entail a nominal addition in weight to the missile.

It is a further object of the present invention to provide apparatus which will produce a retarding force to the missile's thrust distribution structure at lift-off which is constant during a prescribed distance of travel of the missile from the launch paid.

It is still another object of the invention to provide apparatus which will impart a predetermined constant retarding force to a missile's thrust distribution structure at lift-off from a launch pad which is effective for a predetermined time after lift-off has occurred.

It is another object of the invention to provide apparatus to impart a retarding force to a missile, which is applied at the hold down posts of the thrust distribution structure and is independent of the velocity or acceleration of, or the distance traveled by, the missile at launch, for a prescribed distance and time after lift-off of the missile from the launch pad has occurred.

It is further an object of the invention to provide apparatus to produce a predetermined constant retarding force to a missile's thrust distribution structure during a prescribed distance traveled by the missile from the launch pad which can be easily and economically modified at subsequent launches to produce different values of the force and the distance over which the force is effective with a minimum requirement of new, or the testing of old, structural components.

It is another object to provide an apparatus to retard the stress and bending moment change rate in a missile thrust distribution structure which requires no calibration prior to launch and which is not effected by extremes of the environment in which the apparatus is designed to operate.

Other and further objects and advantages of the invention will become clear to those skilled in the art as the description of an embodiment thereof progresses taken in conjunction with the attached drawings in which:

FIGURE 2 is a sectional view of the thrust distribution structure taken normal to the longitudinal axis of the vehicle.

FIGURE 3 is an elevational view, partly in section, of a fragment of the missile, the launch pad support arm, the missile hold down clamp, and the retarding force apparatus of the invention.

FIGURE 4 is an elevational view partly in section of the retarding force apparatus of FIGURE 3.

Figure 1:
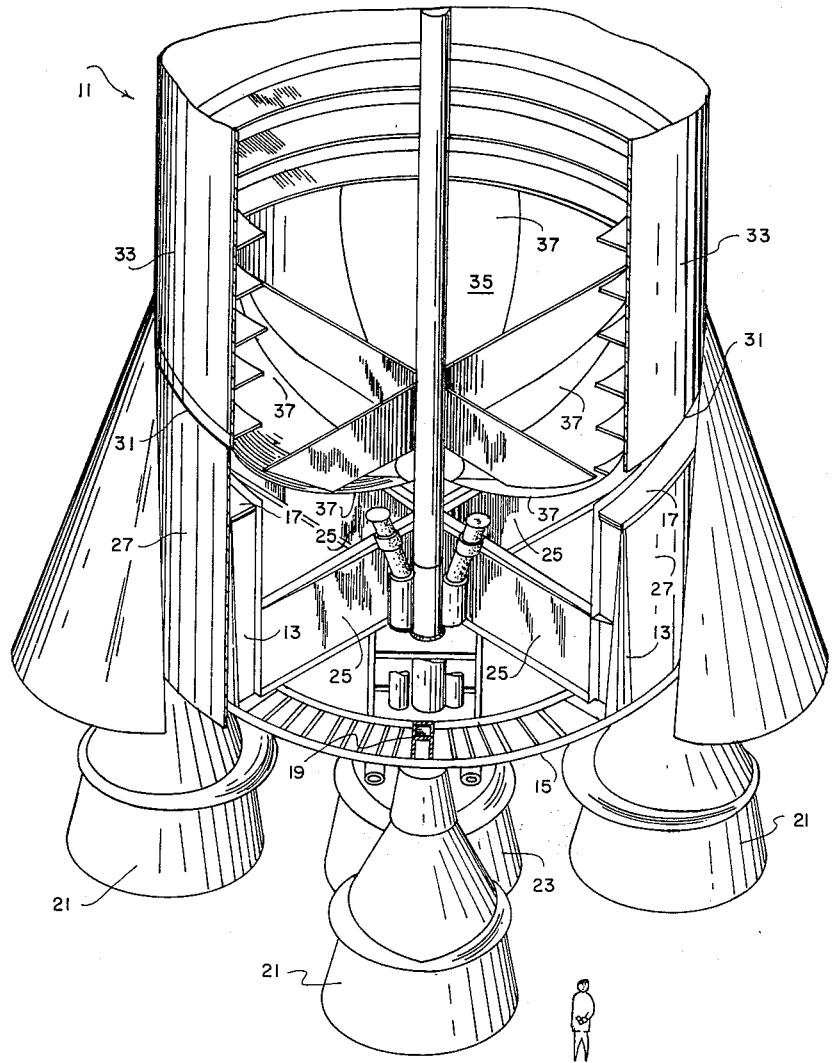
FIGURE 1 is a perspective view of a missile booster, partly in section, illustrating the thrust distribution structure of the booster vehicle.

Referring now to the drawings in which like reference numerals designate like or similar parts and referring particularly to FIGURE 1, a missile booster 11 has at its base a plurality of hold down and support posts 13 oriented vertically (longitudinally) between and rigidily connected to a lower thrust ring 15 and an upper thrust ring 17. There are four posts 13 symmetrically and equally spaced between the thrust rings 15 and 17 around the base of the booster 11. Equally spaced between the hold down and support posts 13 are four thrust posts 19 also extending between lower thrust ring 15 and upper thrust ring 17 to each of which is attached a rocket engine 21.

For purposes of illustration, the booster of FIGURE 1 is the Saturn V launch vehicle which has five F-1 liquid propellant rocket engines. The center engine 23 is attached at the center of the lower thrust ring 15 (in line with the longitudinal axis of the vehicle) to a support block (not shown in FIGURE 1) at the intersection of two mutually perpendicular center engine support members 25 each extending between a pair of diametrically opposed hold down and support posts 13. Rigidly attached to the exterior surface of the thrust posts 19, the hold down and support posts 13, and the upper and lower thrust rings 15 and 17, is a substantially cylindrical thrust distribution member 27 which forms a part of the exterior skin of the vehicle and extends above the upper thrust ring 17 to a juncture 31 with the cylindrical side wall 33 of the propellant tank 35. Juncture 31 is not only the lowermost portion of the propellant tank cylindrical side wall 33 and thus the point at which upper vehicle stress is at a maximum, but the propellant tank lower bulkhead 37 also intersects the tank side wall 33 at juncture 31 applying additional stresses due to the weight and inertia forces of the propellants in tank 35.

As mentioned above, tank wall 33 not only serves to confine the liquid fuel but also serves as the vehicle outer skin and the vehicle's load bearing structure for carrying the entire thrust load transmitted to the portion of the vehicle above juncture 31. The purpose of the two thrust rings and thrust structure 27 is to distribute the concentrated thrust loads of the five engines and the hold down forces applied at each of the four hold down posts as uniformly as possible at juncture 31 so that the bending moments applied to the fuel tank side wall 33 during the normal boost phase of flight is as small as possible and within design limitations. There are, however, other loads applied to thrust distribution member 27 as will be more completely discussed presently.

Referring now to FIGURE 2, the thrust distribution structure is shown in cross section. Symmetrically and equally spaced circumferentially around the interior surface of thrust distributing member 27 there are positioned the four thrust posts 19. The four hold down and support posts 13 are symmetrically spaced around the interior surface of member 27 with each of the posts 19 equally spaced between the two adjacent hold down and support posts 13. The center engine support 25 (which in the present instance is illustrated as a cross beam) is fixedly attached to thrust member 27 through posts 13 and supports the center engine through support block 39. The center engine support 25 also distributes the thrust of the center engine to the vehicle through the hold down posts 13, thrust distribution member 27, and juncture 31 to fuel tank wall 33.

From the foregoing it will be realized that there are two sources of bending moment in the thrust distribution structure that are partially transmitted to the fuel tank walls. First there is a bending moment caused by the concentration of the thrust of each of the five engines at distinct points of the thrust structure which must be distributed and transmitted to the upper booster body through the fuel tank side wall 33. The other source of bending moments induced in the booster thrust distribution structure is the concentrated loads applied to the structure at the four missile hold down posts 13. After ignition of the booster engines, the missile is held down on the launch pad by hold down clamps (referred to more specifically hereinafter) applying downward forces to the missile at each of the four hold down posts. It can be seen that during this period while the engines are building up to their rated launch thrust, there are bending moments developed in the thrust distribution member 27 caused by the five upward engine thrust forces (the center engine thrust force being applied at the four hold down posts through the center engine support cross beam 25) and the four downward hold down clamp forces. The net effect of all forces on the thrust distribution member 27 can be seen to be the resultant of these concentrated loads and the uniformly distributed downward vehicle weight (except the weight of the engine which is concentrated at each engine support) applied through juncture 31. The thrust distribution structure including the thrust rings 15 and 17 and thrust distribution member 27 is designed to withstand these loads and the bending moments caused thereby. However, when the vehicle is ready for launch, the release of the missile hold down clamps causes a rapid change in the bending moments in thrust distribution member 27 which are partially transmitted to the fuel tank walls 33 through juncture 31. It is, of course, this rapid change in the thrust structure bending moments that the present invention reduces to tolerable limits.

Referring now to FIGURE 3 the missile support and hold down posts are provided with a lug 41 which are in bearing contact with launch pad support arm 43 when the missile is on the launch pad prior to engine ignition. The launch pad support arm 43 is provided with a missile hold down clamp having a stationary lower jaw member 44 (which provides the upward support force to the vehicle prior to engine ignition) and an upper movable jaw member 45 pivoted on a pin 46. Lower jaw 44 is the bearing surface of support arm 43 which provides the upward static support of the launch vehicle prior to lift off. For a detailed description of a hold down clamp adapted to operate in the manner indicated for the hold down clamp, see Tiesenhausen U.S. Patent No. 3,038,383. The hold down clamps are adapted to hold the missile on the launch pad by exerting a downward force on lug 41 when the engines are developing thrust greater than the instantaneous gross weight of the vehicle. When all engines are stabilized and developing their rated lift-off thrust, the hold down clamps (one associated with each hold down post 13) are simultaneously released and the vehicle leaves the launch pad.

Prior to the development of thrust by the engines equal to the instantaneous gross weight of the vehicle, the support and hold down posts distribute to the vehicle, forces equal to the instantaneous weight of the vehicle less the thrust, if any, being developed. These forces are applied to the lugs 41 at their lower bearing members 47 by the stationary jaw member 44 of the hold down clamp in the launch pad support arms 43. It can be seen that as the engine thrust builds up, the forces applied to lugs 41 by support arms 43 at the stationary jaw member 44 will decrease by an amount equal to the incremental thrust being developed plus the weight of any nonreplenished vehicle fuel or oxidizer expended. As the thrust builds up, the force applied at lower bearing members 47 will decrease to zero and the hold down clamp will begin to exert a downward force on the vehicle through upper bearing members 49. The force will again be the instantaneous weight of the vehicle less the thrust being developed; in this case the force will be negative indicating a resultant downward force at lug 41 necessary to maintain the vehicle's static stability. At the moment of release of the four hold down clamps, the vehicle will move upward under the unbalanced force system acting on the now relatively free vehicle. Support and hold down posts 13, at the release of the hold down clamps, will rebound upward with a tremendous force due to the stored up bending moment of the thrust distribution structure being instantaneously released. The thrust structure will immediately tend toward an equilibrium condition, but the initial rebound of this structure for the Saturn class of vehicles will be so great that the danger of rupture of the fuel tank wall 33 is feared.

In order to reduce the impact nature of the rebound of the thrust distribution structure on the release of the hold down clamps, an energy absorbing system was designed to provide an incremental transition from full hold down clamp force to unretarded free flight which could be tolerated without design changes and which would not increase, to any material extent, the weight of the vehicle. The system would have to provide a predetermined retarding force over a specified elapsed time and distance traveled by the missile from the launch pad. The energy absorber would have to provide, in the specific Saturn design requirements, a constant 180,000 pounds of force at each of the hold down clamp positions for a period of approximately 0.5 second and a distance of at least 6 inches. The stroke had to be precise after the design was finalized as did the constant retarding force of approximately 180,000 pounds.

Referring again to FIGURE 3, there is a cavity in support arm 43 in which an energy absorber 50 is mounted. The energy absorber 50 is connected at one end to lug 41 through a forked stud 51 having two parallel flanges 53, each with an aperture aligned with the other. Disposed between the parallel flanges 53 is an eye member attached to rod 57 which forms a part of energy absorber 50. The opening in the eye member is aligned with the apertures in flanges 53 and the energy absorber 50 is pivotally connected to lug 41 by a pin 61 extending therethrough. The other end of energy absorber 50 is pivotally connected to support arm 43 by a pin 63 extending through apertures in flanges 65, which are rigidly attached to tube 67 of the energy absorber, and anchored to the support arm 43 in a conventional manner (not explicitly shown).

Referring now to FIGURE 4, the energy absorber 50 is shown in an exploded view. Rod 57 is pivotally attached at one end to the missile while tube 67 is pivotally attached at one end to launch pad support arm 43. The free end of the rod 57 extends into the free end of the tube 67 and is securely attached to mandrel 69 positioned within the tube, the longitudinal axes of the tube, rod and mandrel being collinear. The tube 67 has an undeformed diameter slightly greater than the diameter of forward face 71 of mandrel 69 and smaller than the rearward face 73 of the frusto-conical shaped mandrel 69. Thus as the rod 57 pulls mandrel 69 through the tube toward the tube's free end, the tube is placed in longitudinal tension between its pivotal connection pin 63 and the mandrel 69, while at the same time the tube is in circumferential tension in the area of mandrel contact with the interior surface of the tube. The tube is extruded by the mandrel a distance dependent on the maximum dimension of the mandrel.

The extrusion of the tube 67 is susceptible to analytic analysis and the amount of energy absorbed by the energy absorber 50 will depend on the relative sizes of the undeformed and deformed tube, the stroke or distance the mandrel moves during the extrusion process and the characteristics of the tube material. The retarding force exerted by the tube on the mandrel will be constant after there is relative movement of the mandrel with respect to the tube. Friction between the mandrel and the interior surface of the tube will provide an additional retarding force which will also be relatively constant; variations in the frictional force due to the rate of dissipation of the heat generated by the friction will be very slight and inconsequential when compared to the total retarding forces developed.

It can now be clearly seen that the energy absorber will provide a constant retarding force to the vehicle's thrust distribution structure during the time and for the distance the vehicle moves from the launch pad until the mandrel 69 is completely withdrawn from the tube 67 of the energy absorber 50. The rod 57 and mandrel 69 are then carried by the vehicle or may be jettisoned by conventional means (not shown).

From the foregoing it is readily apparent that there has been described a system for reducing the bending moment rebound occasioned in a missile thrust distribution structure by the sudden release of the force applied by the launch pad hold down clamps. The bending moment change due to the release of the clamps is only partially felt in the area of the fuel tank walls 33 for a period of approximately 0.5 second while the retarding forces of the energy absorbing system are effective. When the energy absorbers have been operated to the end of their stroke, an additional bending moment change is produced which will not be so great as to present a danger of fuel tank rupture. Thus when the force of the hold down clamps is released, the bending moment change is spread over two intervals instead of being concentrated at a single instant. This has been accomplished by providing a device which exhibits to the missile a predetermined constant retarding force applied preferably at the point the hold down clamp force was applied prior to its release and which is effective for a predetermined interval of time after release of the clamps. The apparatus provided includes an energy absorber adaptable to predetermined characteristics of stroke and retarding force.

There has been described the invention in its novel aspects; however, it is to be understood that there has been shown merely an embodiment of the invention and that the invention is not to be limited to the structure shown and described. Obviously numerous modifications and variation of the present invention within the invention's true spirit are possible in the light of the above teachings. It is therefore to be understood that within the scope of the appended claims the invention may be practiced otherwise than as specifically described herein.

What is claimed is:

1. In a missile launch release system combination of a launch pad support arm and a hold down clamp integral therewith and so arranged to provide a downward force to a missile supported by the support arm to maintain the static equilibrium of the missile prior to the missile engines building up to their rated lift-off or launch thrust, a predetermined constant retarding force and stroke energy absorber interconnected between said missile and said launch pad support arm comprising:
   (a) an energy absorbing deformable element having a predetermined longitudinal dimension and thickness; and
   (b) means for deforming said element throughout a predetermined portion of said longitudinal dimension while maintaining the stresses developed in said element by the deformation thereof below the element's ultimate strength, whereby a predetermined constant retarding force depending on the element's material, shape and thickness, is applied to the missile when the hold down clamps are released and the missile moves relative to said launch pad support arm.

2. The invention claimed in claim 1 wherein:
   (a) the energy absorbing deformable element has at least one surface; and
   (b) the deformation of said element is substantially normal to said surface.

3. The invention claimed in claim 2 wherein:
   (a) the energy absorbing deformable element is a tube; and
   (b) the surface is the interior surface of said tube.

4. The invention of claim 3 wherein the means for deforming said element is a mandrel positioned within said tube having a maximum external transverse dimension greater than the maximum transverse dimension of the interior surface of said tube, whereby a retarding force is produced by the resistance of deformation of said tube when there is a relative movement of said mandrel with respect to said tube.

5. A missile launch release system comprising:
   (a) a plurality of missile launch pad support arms;
   (b) a missile positioned on and supported by said support arm, said missile having a plurality of missile support lugs extending from the base of said missile, one of said lugs corresponding to each of said support arms and each of said lugs being provided with two bearing surfaces, one of said surfaces being downward and in bearing contact with said support arm and providing an upward support to said missile to maintain the missile in static equilibrium, the other of said bearing surfaces being disposed upward;
(c) a plurality of missile hold down clamps, one corresponding to each support arm, each of said clamps having:
  (1) a stationary jaw providing the upward bearing surface of said corresponding support arm to said downward bearing surface of said missile support lug; and
  (2) a two position pivotally mounted jaw having a bearing surface in bearing contact with said upwardly disposed bearing surface of the corresponding missile support lug when said clamp is in a closed position, said clamp jaw bearing surface being out of contact with said missile support lug when said clamp is in an open position; and
(d) a plurality of predetermined constant retarding force and stroke longitudinally acting energy absorbers, one interconnected between each of the corresponding missile support lugs and launch pad support arms; whereby a predetermined constant retarding force is applied to said missile for a predetermined distance of movement of said missile relative to said launch pad support arms after said hold down clamps are released.

6. The invention claimed in claim 5 wherein the energy absorbers include:
(a) an energy absorbing deformable element; and
(b) means for deforming said element while maintaining the stresses developed in said element by the deformation thereof less than the element's ultimate strength.

7. The invention of claim 6 wherein:
(a) the energy absorbing deformable element has at least one surface; and
(b) the deformation of said element is normal to said surface.

8. The invention claimed in claim 7 wherein:
(a) the energy absorbing deformable element is a tube;
(b) the surface is the interior surface of said tube; and
(c) the means for deforming said element is a mandrel positioned within said tube, said mandrel having its maximum external sectional dimension greater than the maximum sectional dimension of said tube; whereby said tube is radially deformed by said mandrel when there is a relative movement of said mandrel with respect to said tube.

9. In a missile launch release system in which a rocket engine propelled missile is held down on a launch pad by a plurality of hold down clamps which, when all engines are developing lift-off thrust, are simultaneously released, apparatus for reducing the bending moment change rate in the missile's thrust distribution structure comprising means for applying a predetermined constant retarding force to the missile's thrust distribution structure which is independent of the vehicle's nonzero velocity; said retarding force being effective for a predetermined distance of travel of the missile from the launch pad after said hold down clamps are released; said means for applying the predetermined constant retarding force to the missile's thrust distribution structure being a plurality of energy absorbers which include:
(a) a tube pivotally anchored at one end to the launch pad and having a free end;
(b) a rod pivotally attached to the missile's thrust distribution structure at one end and having a free end extending longitudinally into the tube at the tube's free end;
(c) a mandrel disposed within said tube and attached to said rod at its free end, said mandrel having its maximum exterior sectional dimension greater than the maximum interior sectional dimension of said tube;
(d) whereby said tube is extruded by the mandrel when there is relative movement of the missile with respect to the launch pad, and the stresses developed in said tube by the extrusion thereof by the mandrel remain less than the tube's ultimate strength.

References Cited by the Examiner
UNITED STATES PATENTS

| | | | |
|---|---|---|---|
| 2,801,571 | 8/1957 | Lusser | 89—1.7 |
| 2,867,153 | 1/1959 | Hirsch | 89—1.7 |
| 3,038,383 | 6/1962 | Von Tiesenhausen | 89—1.7 |

BENJAMIN A. BORCHELT, *Primary Examiner.*

SAMUEL W. ENGLE, *Examiner.*